(12) United States Patent
Bischoff et al.

(10) Patent No.: US 12,718,624 B2
(45) Date of Patent: Aug. 25, 2026

(54) SYSTEMS AND METHODS FOR DETECTING FRAUDULENT FACIAL RECOGNITION ATTEMPT

(71) Applicant: BI Incorporated, Boulder, CO (US)

(72) Inventors: Todd Bischoff, Westminster, CO (US); Gaurav Girish, Las Vegas, NV (US)

(73) Assignee: BI Incorporated, Boulder, CO (US)

( * ) Notice: Subject to any disclaimer, the term of this patent is extended or adjusted under 35 U.S.C. 154(b) by 0 days.

(21) Appl. No.: 18/819,341

(22) Filed: Aug. 29, 2024

(65) Prior Publication Data

US 2025/0273014 A1 Aug. 28, 2025

Related U.S. Application Data

(60) Provisional application No. 63/557,894, filed on Feb. 26, 2024.

(51) Int. Cl.

| | |
|---|---|
| ***H04N 7/18*** | (2006.01) |
| ***G06V 20/52*** | (2022.01) |
| ***G06V 40/16*** | (2022.01) |
| ***G06V 40/20*** | (2022.01) |
| ***G06V 40/40*** | (2022.01) |

(52) U.S. Cl.

CPC .............. *G06V 40/45* (2022.01); *G06V 20/52* (2022.01); *G06V 40/166* (2022.01); *G06V 40/20* (2022.01); *H04N 7/183* (2013.01)

(58) Field of Classification Search

CPC ........ H04N 7/183; G06V 40/45; G06V 20/52; G06V 40/166; G06V 40/20

USPC .......................................................... 348/77

See application file for complete search history.

(56) References Cited

U.S. PATENT DOCUMENTS

| | | | | |
|---|---|---|---|---|
| 11,257,239 | B2 * | 2/2022 | Takeyasu ............. | G06V 10/454 |
| 11,710,223 | B2 * | 7/2023 | Woodall ............... | H04N 23/681 382/107 |
| 12,324,675 | B2 * | 6/2025 | Levey .................. | A61B 5/1103 |
| 2015/0338915 | A1 | 11/2015 | Publicover et al. | |
| 2018/0307815 | A1 | 10/2018 | Samadani et al. | |
| 2022/0117529 | A1 | 4/2022 | Filimonov et al. | |
| 2023/0290185 | A1 | 9/2023 | Liljestrand et al. | |

FOREIGN PATENT DOCUMENTS

| | | | | |
|---|---|---|---|---|
| CN | 110532887 A | * 12/2019 | ............... | G06K 9/00 |

OTHER PUBLICATIONS

International Search Report Issued in corresponding PCT Application No. PCT/US2025/015073, dated Apr. 4, 2025 (4 Pages).
Written Opinion of the International Searching Authority Issued in corresponding PCT Application No. PCT/US2025/015073, dated Apr. 4, 2025 (13 Pages).

* cited by examiner

*Primary Examiner* — Trang U Tran
(74) *Attorney, Agent, or Firm* — Osha Bergman Watanabe & Burton LLP

(57) ABSTRACT

Various embodiments provide systems and methods for validating imaging of a monitored individual.

19 Claims, 10 Drawing Sheets

SYSTEMS AND METHODS FOR DETECTING FRAUDULENT FACIAL RECOGNITION ATTEMPT

CROSS REFERENCE TO RELATED APPLICATION

The present application claims priority to U.S. Provisional Application No. 63/557,894 entitled "Detecting Fraudulent Facial Recognition Attempt" and filed Feb. 26, 2024 by Bischoff. The entirety of the aforementioned reference is incorporated herein by reference for all purposes.

BACKGROUND OF THE INVENTION

Various embodiments provide systems and methods for validating imaging of a monitored individual.

Large numbers of individuals are currently monitored as part of parole requirements or other requirements. Such monitoring allows a monitoring agency to determine whether the individual is engaging in acceptable patterns of behavior, and where an unacceptable behavior is identified to stop such behavior going forward. In some cases, such monitored individuals are required to periodically check-in using some type of video calling where the image of the monitored individual can be verified. In some cases, monitored individuals may use a static image or a prerecorded video of themselves to fraudulently satisfy the check-in requirements.

Thus, for at least the aforementioned reasons, there exists a need in the art for more advanced approaches, devices and systems for determining the validity of a check-in by a monitored individual.

BRIEF SUMMARY OF THE INVENTION

Various embodiments provide systems and methods for validating imaging of a monitored individual.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
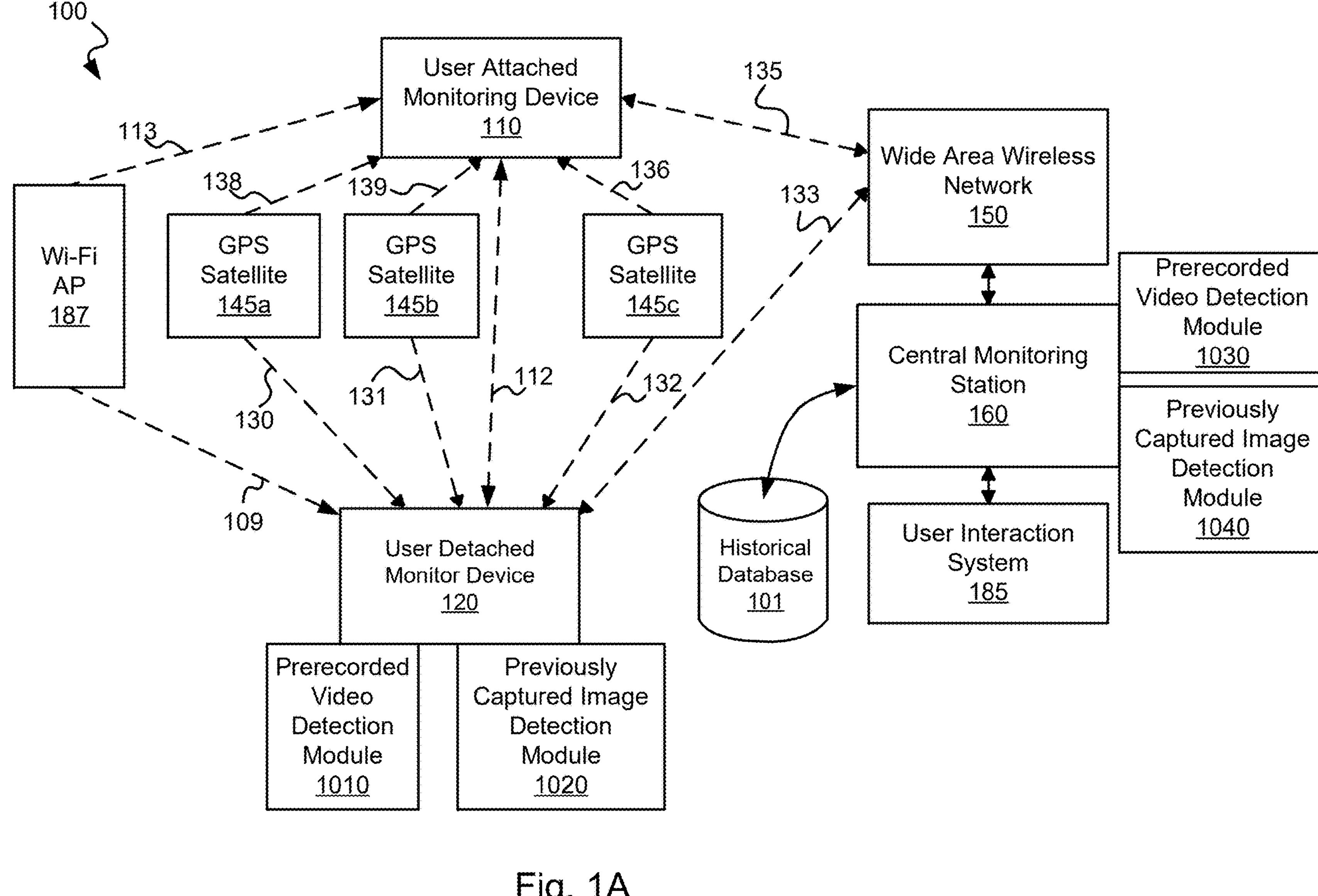
FIG. 1A is a block diagram illustrating a hybrid monitoring system including a user attached monitor device, a user detached monitor device, a central monitoring station, and at least one pair of a prerecorded video detection module and a previously captured image detection module in accordance with various embodiments.

Various embodiments provide systems and methods for validating imaging of a monitored individual.

It has been found that returning offenders to society after being locked up in a secure facility with little if any control of their day to day activities is often unsuccessful. It can be helpful to have, for example, a parole officer monitor their movements and activities for a period of time as they reenter society. In some cases, this monitoring may include periodic check-in of the monitored individual with the parole officer. During such check-ins, a video call between the monitored individual and the parole officer may be used to allow the parole officer to visually determine that the individual checking in is actually the monitored individual. It is possible that the monitored individual may cause transmission of a previously static image and/or a prerecorded video of themselves. Doing such would allow, for example, the monitored individual to be somewhere else other than at the prescribed check-in and/or hide the fact that the monitored individual is impaired. Various embodiments disclosed herein may be used to detect such use of a static image or a prerecorded video image. Based upon the disclosure provided herein, one of ordinary skill in the art will recognize other uses for the various embodiments disclosed herein.

Various embodiments provide systems for monitoring an individual. The systems include a user detached monitor device that includes: a camera, a frame rate control module configured to generate an image timing output that is modified in at least one of phase, a communication circuit, a processor, and a computer readable medium communicably coupled to the processor. The computer readable medium includes instructions which when executed by the processor cause the camera to capture a series of images at respective times governed by the image timing output.

In some instances of the aforementioned embodiments, the frame rate control module generates the image timing output by adding a delay to at least one period of a default periodic timing to adjust at least a current phase of the default periodic timing. In various instances of the aforementioned embodiments, the frame rate control module generates the image timing output by modifying at least one period of a default periodic timing. In some such instances, modifying the modifying at least one period of the default periodic timing includes increasing a period of the default periodic timing. In other such instances, modifying the modifying at least one period of the default periodic timing includes decreasing a period of the default periodic timing. In some cases, the at least one period of the default periodic timing is a first period, and modifying the at least one period of a default periodic timing further comprises increasing a subsequent period of the default periodic timing. In particular cases, increasing the subsequent period includes increasing by a magnitude, and decreasing includes decreasing by the same magnitude resulting in an average period of the image timing output being the same as an average period of the default periodic timing.

In various instances of the aforementioned embodiments, the computer readable medium further includes instructions which when executed by the processor cause: processing the series of images to detect eyelid movement between respective ones of the series of images; and indicating that the series of images represent a live individual when a defined number of eyelid movements are detected. In some such instances, an eyelid movement is defined as a movement between greater than or equal to eighty percent open and less than or equal to twenty percent open.

In some instances of the aforementioned embodiments, the computer readable medium further includes instructions which when executed by the processor cause: processing the series of images to detect artefacts indicative of images captured from a prerecorded video; and indicating that the series of images represent a live individual when fewer than a defined number of artefacts are detected. In some cases the artefacts are detected each time one of the series of images is incomplete.

Other embodiments provide systems for monitoring an individual that include a user detached monitor device and a central monitoring station. The user detached monitor device includes: a camera, a frame rate control module configured to generate an image timing output that is modified in at least one of phase, a communication circuit, a first processor, and first computer readable medium communicably coupled to the first processor. The first computer readable medium includes instructions which when executed by the first processor cause: the camera to capture a series of images at respective times governed by the image timing output, and the communication circuit to transmit the series of images to a central monitoring station.

The central monitoring station is communicably coupled to the user detached monitor device via the communication circuit, and comprises a second processor and a second computer readable medium communicably coupled to the second processor. The second computer readable medium includes instructions which when executed by the second processor cause: the central monitoring station to process the series of images to detect eyelid movement between respective ones of the series of images; and indicate that the series of images represent a live individual when a defined number of eyelid movements are detected.

In some embodiments, the second computer readable medium includes instructions which when executed by the second processor cause: the central monitoring station to process the series of images to detect artefacts indicative of images captured from a prerecorded video; and indicate that the series of images represent a live individual when fewer than a defined number of artefacts are detected.

Turning to FIG. 1A, a block diagram illustrates a hybrid monitoring system 100 including a user attached monitor device 110, a user detached monitor device 120, a central monitoring station 160, and at least one pair of a prerecorded video detection module 1010, 1030 and a previously captured image detection module (1020, 1040) in accordance with some embodiments. A local communication link 112 allows for communication between user attached monitor device 110 and user detached monitor device 120. Local communication link 112 may be any communication link that is capable of transferring information or otherwise communicating between two devices within a relatively short distance of each other. In some cases, for example, local communication link 112 may be a Bluetooth™ communication link. In other examples, local communication link 112 may be a line of sight infrared communication link. As yet other examples, local communication link 112 may be a WiFi communication link. Based upon the disclosure provided herein, one of ordinary skill in the art will recognize a variety of communication protocols and/or media that may be used to implement local communication link 112.

User detached monitor device 120 is portable, and may be any device that is recognized as being used by or assigned to an individual being monitored, but is not physically attached to the individual being monitored by a tamper evident attaching device. User detached monitor device 120 may be, but is not limited to, a cellular telephone capable of communication with user attached monitor device 110 via local communication link 112. In contrast, user attached monitor device 110 is attached to the individual being monitored using a tamper evident attaching device like a strap. User attached monitor device 110 may be, but is not limited to, a tracking device that is attached around the limb of an individual and includes indicators to monitor whether the device has been removed from the individual or otherwise tampered. Hybrid monitoring system 100 further includes a central monitoring station 160 wirelessly coupled to user attached monitor device 110 and user detached monitor device 120 via one or more wide area wireless (e.g., cellular telephone network, Internet via a Wi-Fi access point, or the like) communication networks 150.

User detached monitor device 120 includes a location sensor that senses the location of the device and generates a location data. For example, when user detached monitor device 120 is capable of receiving wireless global navigation satellite system (hereinafter "GNSS") location information 130, 131, 132 from a sufficient number of GPS or GNSS satellites 145 respectively, user detached monitor device 120 may use the received wireless GNSS location information to calculate or otherwise determine the location of user attached monitor device 110. Global positioning system (hereinafter "GPS) is one example of a GNSS location system. While GPS is used in the specific embodiments discussed herein, it is recognized that GPS may be replaced by any type of GNSS system. In some instances, this location includes latitude, longitude, and elevation. It should be noted that other types of earth-based triangulation may be used in accordance with different embodiments of the present invention. For example, other cell phone based triangulation, UHF band triangulation such as, for example, long range (hereinafter "LoRa") triangulation signals. Based on the disclosure provided herein, one of ordinary skill in the art will recognize other types of earth-based triangulation that may be used. The location data may comprise one or more of, but is not limited to: global positioning system ("GPS") data, Assisted GPS ("A-GPS") data, Advanced Forward Link Trilateration ("AFLT") data, and/or cell tower triangulation data. Where GPS is used, user detached monitor device 120 receives location information from three or more GPS satellites 145*a*, 145*b*, 145*c* via respective communication links 130, 131, 132. The aforementioned location data is utilized to verify the location of a monitored individual associated with user detached monitor device 120 at various points as more fully discussed below. User detached monitor device 120 is considered "ambiguous" because it is not attached to the monitored individual in a tamper resistant/evident way, but rather is freely severable from the monitored individual and thus could be used by persons other than the monitored individual. Various processes discussed herein mitigate the aforementioned ambiguity to yield a reasonable belief that information derived from user detached monitor device 120 corresponds to the monitored individual.

The location data and/or other data gathered by user detached monitor device 120 is wirelessly transmitted to central monitoring station 160 via wide area wireless network 150 accessed via a wireless link 133. Central monitoring station 160 may be any location, device or system where the location data is received, including by way of non-limiting example: a cellular/smart phone, an email account, a website, a network database, and a memory device. The location data is stored by central monitoring station 160 and is retrievable by a monitor, such as a parent, guardian, parole officer, court liaison, spouse, friend, or other authorized group or individual. In this manner, the monitor is able to respond appropriately to the detected out-of-bounds activity by a monitored individual. In some cases, the monitor is able to retrieve the location data via a user interaction system 185 which may be, but is not limited to, a network connected user interface device communicatively coupled via a network to central monitoring station 160 and/or directly to user detached monitor device 120 via wide area wireless network 150.

User detached monitor device 120 may further include a user identification sensor operable to generate user identification data for identifying the monitored individual in association with the generation of the location data. The user identification data may comprise one or more of: image data, video data, biometric data (e.g. fingerprint, DNA, retinal scan, facial recognition, etc. data), or any other type of data that may be used to verify the identity of the monitored individual at or near the time the location data is generated. And the user identification sensor may comprise one or more of: a camera, microphone, heat sensor, biometric data sensor, or any other type of device capable of sensing/generating the aforementioned types of user identification data.

The user identification data is wirelessly transmitted in association with the location data to central monitoring station 160 via a wireless transmitter communicatively coupled to the user identification sensor. The user identification data is stored in association with the location data by central monitoring station 160 and is retrievable therefrom by a monitor, such as a parent, guardian, parole officer, court liaison, spouse, friend, or other authorized group or individual. Preferably, the monitor is able to retrieve the location data via a network connected user interface device communicatively coupled—via the network—to central monitoring station 160 and/or to user detached monitor device 120. The location data may be transmitted to central monitoring station 160 independent of the user identification data, for example, during a periodic check-in with central monitoring system 160.

User detached monitor device 120 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware-based based instructions) executable by the control unit to perform and/or enable various functions associated with user detached monitor device 120. As user detached monitor device 120 is portable, each of the components may be located within, immediately adjacent to, or exposed without, a device housing whose dimensions are such that user detached monitor device 120 as a whole may be discretely carried by the user, for example, within a pocket or small purse. User detached monitor device 120 may include a Wi-Fi transceiver capable of receiving information from one or more Wi-Fi access points 187 that can be used to discern location via a Wi-Fi communication link 109.

In some embodiments, user detached monitor device 120 includes a prerecorded video detection module 1010. In some embodiments, prerecorded video detection module 1010 is implemented as instructions maintained on a memory (not shown) of user detached monitor device 120 that are executable by a processor (not shown) of user detached monitor device 120. In other embodiments, prerecorded video detection module 1010 is implemented as a dedicated circuit in user detached monitor device 120.

In some embodiments, prerecorded video detection module 1010 receives a series of images captured by forward camera 172 (shown in FIG. 1B) of user detached monitor device 120. The series of images are captured at a rate controlled by a frame rate control module 193 (shown in FIG. 1B). The rate at which frame rate control module 193 causes the images to be captured is purposely varied from a standard video output rate. This may include, for example, capturing an image a varied rate (e.g., at an average of 30 Hz, but varying the period between captures as shown below in FIG. 3) and/or periodically moving the phase at which the capture occurs (shown below in FIG. 3).

Prerecorded video detection module 1010 generates a video output using a video rate of, for example, sixty (60) images per second to yield a sixty (60) frame per second. Based upon the disclosure provided herein, one of ordinary skill in the art will recognize a variety of rates at which the received series of images may be displayed to yield a video output.

Prerecorded video detection module 1010 then processes the video output to detect any artefacts caused by a mismatch in the sampling rate used by the user detached monitor device and a prerecorded video of the monitored individual. Where forward camera 172 of user detached monitor device 120 is trained on the face of the monitored individual, each image captured by user detached monitor device 120 will show all of the monitored individuals face similar to that shown below in FIG. 4A. In contrast, where forward camera 172 of user detached monitor device 120 is trained on a prerecorded video of the monitored individual, any mismatch between the sampling rate used by user detached monitor device 120 as directed by frame rate control module 193 and a frame rate and/or phase of the prerecorded video of the monitored individual will result in artefacts (e.g., partial images) as shown below in FIG. 4B.

Where a defined number of artefacts (e.g., artefacts per second) is detected, prerecorded video detection module 1010 provides an indication of a non-live video stream from user detached monitored device 120 to a processor of user detached monitor device 120. This indication may then be transmitted to central monitoring station 160. The defined number of artefacts may, for example, be a user programmed variable. Such an indication may be used, for example, to alert a monitoring individual of an apparent attempt to cheat on the requested check-in. Alternative, where a defined number of artefacts (e.g., artefacts per second) is not detected, prerecorded video detection module 1010 provides an indication of a live video stream from user detached monitored device 120 to the processor of user detached monitor device 120.

In some embodiments, user detached monitor device 120 includes a previously captured image detection module 1020. In some embodiments, previously captured image detection module 1020 is implemented as instructions maintained on a memory (not shown) of user detached monitor device 120 that are executable by a processor (not shown) of user detached monitor device 120. In other embodiments, previously captured image detection module 1020 is implemented as a dedicated circuit in user detached monitor device 120.

In some embodiments, previously captured image detection module 1020 receives the series of images captured by forward camera 172 (shown in FIG. 1B) of user detached monitor device 120. Previously captured image detection module 1020 determines whether a pre-captured static image of the monitored individual is being captured by forward camera 172 of user detached monitor device 120. In some cases, a monitored individual may direct the camera of the user detached monitor device to a previously captured image of the monitored individual. In such a case, the series of images received will be substantially the same. Where such substantial similarity is not detected by previously captured image detection module 1020, previously captured image detection module 1020 generates an indication of a non-live image that is provided to a processor of user detached monitor device 120.

In some embodiments, detection of substantial similarity includes comparison of eyelid movement between captured images. Where it is found that the eyelid has transitioned from an upper value percent open to a lower value percent open or from the lower value percent open to the upper value percent open across a limited sequence of images of the monitored individual received from the user detached monitor device, the received images are considered to be of a live individual and not a previously captured image of the individual. In some embodiments, the upper value, the lower value, and/or the number of images (i.e., the limited sequence of images) are user programmable. The upper value and the lower value are measured as a percentage of the eyeball exposed by an open eyelid. Careful research and analysis has revealed that an upper value of eighty (80) percent open and the lower value of twenty (20) percent open provide a good balance between improperly characterizing a sequence of images from a live individual as from a previously captured image, and improperly characterizing a sequence of images from a previously captured image as being from a live individual.

Where such substantial similarity is detected by previously captured image detection module 1020, previously captured image detection module 1020 generates an indication of a live shot from user detached monitor device 120 that is sent to a processor of user detached monitor device 120. User detached monitor device 120 may combine the indications of live images and live video and provide an indication of whether the images captured by forward camera 172 are of a live individual are from one of a previously captured image of an individual or a prerecorded video of an individual. This information may be transmitted from user detached monitor device 120 to central monitoring station 160.

Central monitoring station 160 may include a server supported website, which may be supported by a server system comprising one or more physical servers, each having a processor, a memory, an operating system, input/output interfaces, and network interfaces, all known in the art, coupled to the network. The server supported website comprises one or more interactive web portals through which the monitor may monitor the location of the monitored individual in accordance with the described embodiments. In particular, the interactive web portals may enable the monitor to retrieve the location and user identification data of one or more monitored individuals, set or modify 'check-in' schedules, and/or set or modify preferences. The interactive web portals are accessible via a personal computing device, such as for example, a home computer, laptop, tablet, and/or smart phone.

In some embodiments, the server supported website comprises a mobile website or mobile application accessible via a software application on a mobile device (e.g. smart phone). The mobile website may be a modified version of the server supported website with limited or additional capabilities suited for mobile location monitoring.

In some embodiments, central monitoring station 160 includes a prerecorded video detection module 1030. In some embodiments, prerecorded video detection module 1030 is implemented as instructions maintained on a memory (not shown) of central monitoring station 160 that are executable by a processor (not shown) of central monitoring station 160. In other embodiments, prerecorded video detection module 1010 is implemented as a dedicated circuit in central monitoring station 160.

In some embodiments, prerecorded video detection module 1030 receives a series of images captured by forward camera 172 (shown in FIG. 1B) of user detached monitor device 120. The series of images are captured at a rate controlled by a frame rate control module 193 (shown in FIG. 1B). The rate at which frame rate control module 193 causes the images to be captured is purposely varied from a standard video output rate. This may include, for example, capturing an image a varied rate (e.g., at an average of 30 Hz, but varying the period between captures as shown below in FIG. 3) and/or periodically moving the phase at which the capture occurs (shown below in FIG. 3).

Prerecorded video detection module 1030 generates a video output using a video rate of, for example, sixty (60) images per second to yield a sixty (60) frame per second. Based upon the disclosure provided herein, one of ordinary skill in the art will recognize a variety of rates at which the received series of images may be displayed to yield a video output.

Prerecorded video detection module 1030 then processes the video output to detect any artefacts caused by a mismatch in the sampling rate used by the user detached monitor device and a prerecorded video of the monitored individual. Where forward camera 172 of user detached monitor device 120 is trained on the face of the monitored individual, each image captured by user detached monitor device 120 will show all of the monitored individuals face similar to that shown below in FIG. 4A. In contrast, where forward camera 172 of user detached monitor device 120 is trained on a prerecorded video of the monitored individual, any mismatch between the sampling rate used by user detached monitor device 120 as directed by frame rate control module 193 and a frame rate and/or phase of the prerecorded video of the monitored individual will result in artefacts (e.g., partial images) as shown below in FIG. 4B.

Where a defined number of artefacts (e.g., artefacts per second) is detected, prerecorded video detection module 1030 provides an indication of a non-live video stream from user detached monitored device 120 to a processor of central monitoring station 160. The defined number of artefacts may, for example, be a user programmed variable. Such an indication may be used, for example, to alert a monitoring individual of an apparent attempt to cheat on the requested check-in. Alternative, where a defined number of artefacts (e.g., artefacts per second) is not detected, prerecorded video detection module 1030 provides an indication of a live video stream from user detached monitored device 120 to the processor of central monitoring station 160.

In some embodiments, central monitoring station 160 includes a previously captured image detection module 1040. In some embodiments, previously captured image detection module 1040 is implemented as instructions maintained on a memory (not shown) of central monitoring station 160 that are executable by a processor (not shown) of central monitoring station 160. In other embodiments, previously captured image detection module 1040 is implemented as a dedicated circuit in central monitoring station 160.

In some embodiments, previously captured image detection module 1040 receives the series of images captured by forward camera 173 (shown in FIG. 1B) of user detached monitor device 120. Previously captured image detection module 1040 determines whether a pre-captured static image of the monitored individual is being captured by forward camera 172 of user detached monitor device 120. In some cases, a monitored individual may direct the camera of user detached monitor device 120 to a previously captured image of the monitored individual. In such a case, the series of images received will be substantially the same. Where such substantial similarity is not detected by previously captured image detection module 1040, previously captured image detection module 1040 generates an indication of a non-live image that is provided to a processor of central monitoring station 160.

In some embodiments, detection of substantial similarity includes comparison of eyelid movement between captured images. Where it is found that the eyelid has transitioned from an upper value percent open to a lower value percent open or from the lower value percent open to the upper value percent open across a limited sequence of images of the monitored individual received from the user detached monitor device, the received images are considered to be of a live individual and not a previously captured image of the individual. In some embodiments, the upper value, the lower value, and/or the number of images (i.e., the limited sequence of images) are user programmable. The upper value and the lower value are measured as a percentage of the eyeball exposed by an open eyelid. Careful research and analysis has revealed that an upper value of eighty (80) percent open and the lower value of twenty (20) percent open provide a good balance between improperly characterizing a sequence of images from a live individual as from a previously captured image, and improperly characterizing a sequence of images from a previously captured image as being from a live individual.

Where such substantial similarity is detected by previously captured image detection module 1040, previously captured image detection module 1040 generates an indication of a live shot from central monitoring station 160 that is sent to a processor of central monitoring station. Central monitoring station 160 may combine the indications of live images and live video and generate an indication of whether the images captured by forward camera 172 of user detached monitor device 120 are of a live individual are from one of a previously captured image of an individual or a prerecorded video of an individual.

User attached monitor device 110 includes a location sensor that senses the location of the device and generates a location data. For example, when user attached monitor device 110 is capable of receiving wireless global navigation satellite system (hereinafter "GNSS") location information 136, 138, 139 from a sufficient number of GPS or GNSS satellites 145 respectively, user attached monitor device may use the received wireless GNSS location information to calculate or otherwise determine the location of human subject 110. Global positioning system (hereinafter "GPS) is one example of a GNSS location system. While GPS is used in the specific embodiments discussed herein, it is recognized that GPS may be replaced by any type of GNSS system. In some instances, this location includes latitude, longitude, and elevation. It should be noted that other types of earth-based triangulation may be used in accordance with different embodiments of the present invention. For example, other cell phone based triangulation, UHF band triangulation such as, for example, long range (hereinafter "LoRa") triangulation signals. Based on the disclosure provided herein, one of ordinary skill in the art will recognize other types of earth-based triangulation that may be used. The location data may comprise one or more of, but is not limited to: global positioning system ("GPS") data, Assisted GPS ("A-GPS") data, Advanced Forward Link Trilateration ("AFLT") data, and/or cell tower triangulation data. Where GPS is used, user attached monitor device 110 receives location information from three or more GPS or GNSS satellites 145 via respective communication links 136, 138, 139. The location data and/or other data gathered by user attached monitor device 110 is wirelessly transmitted to central monitoring station 160 via wide area wireless network 150 accessed via a wireless link 135. Again, central monitoring station 160 may be any location, device or system where the location data is received, including by way of non-limiting example: a cellular/smart phone, an email account, a website, a network database, and a memory device. The location data is stored by central monitoring station 160 and is retrievable by a monitor, such as a parent, guardian, parole officer, court liaison, spouse, friend, or other authorized group or individual. In this manner, monitor is able to respond appropriately to the detected out-of-bounds activity by a monitored individual.

User attached monitor device 110 may further comprise a memory communicatively coupled to a control unit—which is also communicatively coupled to the location sensor, the identification sensor and the wireless transceiver—for controlling the operations thereof in accordance with the functionalities described herein. The memory may include non-transient instructions (e.g., software of firmware-based based instructions) executable by the control unit to perform and/or enable various functions associated with user attached monitor device 110. User attached monitor device may include a strap which can be wrapped around a limb of the individual being monitored to secure user attached monitor device to the monitored individual. The strap includes one or more tamper circuits and/or sensors that allow for a determination as to whether the device has been removed or otherwise tampered. Examples of a strap and tamper detection circuitry that may be used in relation to various embodiments discussed herein are described in U.S. Pat. No. 9,355,579 entitled "Methods for Image Based Tamper Detection", and filed by Buck et al. on Sep. 15, 2014; and U.S. Pat. Pub. No. US 2017-0270778 A1 entitled "Systems and Methods for Improved Monitor Attachment", and filed by Melton et al. on Mar. 21, 2016. Both of the aforementioned references are incorporated herein by reference for all purposes. Based upon the disclosure provided herein, one of ordinary skill in the art will recognize a variety of straps, tamper circuits, tamper devices, and/or attachment and tamper detection approaches that may be used in relation to various embodiments. User attached monitor device 110 may include a Wi-Fi transceiver capable of receiving information from one or more Wi-Fi access points 187 that may be used to identify location via a Wi-Fi communication link 113.

Central monitoring station 160 is communicably coupled to a historical database 101. Historical database 101 includes a variety of data corresponding to a monitored individual including, but not limited to, types of addictions and problems that the individual has had in the past, last incident of substance abuse and the type of substance used, physical locations visited by the monitored individual during a previous time period, other monitored individuals that the monitored individual has been in proximity to and the types of addictions and problems that the other monitored individuals have had in the past, triggering events that have preceded prior addiction relapses of the monitored individual, and/or recent scenarios that are similar to prior triggering events. Based upon the disclosure provided herein, one of ordinary skill in the art will recognize other historical data related to a monitored individual that may be maintained in historical database in accordance with various embodiments.

Figure 1B:
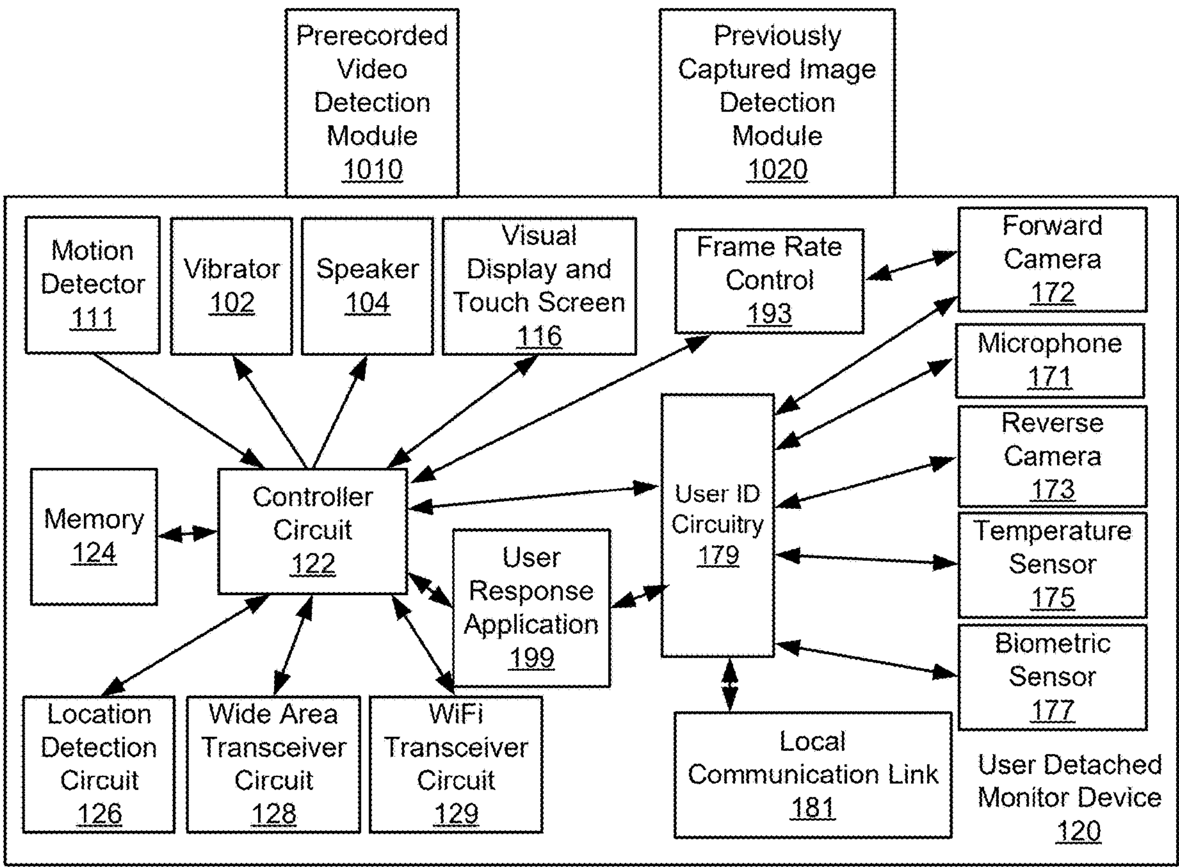
FIG. 1B is a block diagram of a user detached monitor device including a frame rate control module in accordance with one or more embodiments.

Turning to FIG. 1B, a block diagram of user detached monitor device 120 is shown in accordance with one or more embodiments. User detached monitor device 120 includes wireless transceiver circuitry 128 that is capable of sending and receiving information via wireless link 133 to/from wide area wireless network 150. Wireless transceiver circuitry 128 may be any circuitry, integrated circuit, and/or processor or controller capable of supporting wireless communication. Such wireless communication may include, but is not limited to, cellular telephone communication, Internet communication via a Wi-Fi access point, or both. In addition, user detached monitor device 120 includes a vibrator 112, a speaker 114, and a visual display and touch screen 116. In some cases, at scheduled times a monitored individual associated with user detached monitor device 120 is alerted of a need to check-in. The schedule of check-in times may be downloaded to a memory 124 by central monitoring station 160 via wireless link 133. Alternatively, or in addition, check-in requests may be received from central monitoring station 160. Based upon the disclosure provided herein, one of ordinary skill in the art will recognize a variety of mechanisms for alerting of a check-in. The monitored individual may be alerted by one or more of: a visual prompt via visual display and touch screen 116, an audio prompt via speaker 114, and a tactile prompt via vibrator 112. Each of vibrator 112, speaker 114, and visual display and touch screen 116 is communicatively coupled to memory 124 and/or a controller circuit 122 for controlling the operations thereof. In some cases, controller circuit 122 includes a processor. In various cases, controller circuit 122 is part of an integrated circuit. In one or more cases, memory 124 is included in an integrated circuit with controller circuit 122. In various cases, memory 124 may include non-transient instructions (e.g., software or firmware-based based instructions) executable by controller circuit 122 to perform and/or enable various functions associated with user detached monitor device 120. In some embodiments, controller circuit 122 executes instructions that may perform functions such as those discussed below in relation to FIGS. 5-7.

A visual prompt may include, but is not limited to, text, images and/or a combination thereof, or a series of such visual prompts. An audio prompt may include, but is not limited to, one or more different audio prompts, or a series thereof. Each prompt may be stored in memory 124 and retrieved in accordance with the schedule that is also maintained in memory 124. In some embodiments, alerting the monitored individual involves a prompt that includes an e-mail or text message generated by central monitoring station 160 (e.g. the server supported website) and transmitted to the e-mail account or cellular phone number corresponding to user detached monitor device 120. In particular embodiments, such a prompt may include a 'post' on the user's 'wall,' 'feed,' or other social networking privilege. In some embodiments, the prompt may comprise an automated or live phone call to the monitored individual.

User detached monitor device 120 further includes user identification circuitry 179 capable of gathering user identification information from one or more of a microphone 171, a forward camera 172, a reverse camera 173, a temperature sensor 175, and/or a biometric sensor 177. In some cases, user identification circuitry 179 is incorporated in an integrated circuit with controller circuit 122. Microphone 171 is capable of accurately capturing the sound of a monitored individual's voice, forward camera 172 is capable of accurately capturing images including, for example, an image of the monitored individual's face, temperature sensor 175 is capable of accurately capturing an ambient temperature around user detached monitor device 120, and biometric sensor 177 is capable of accurately capturing biometric data about the monitored individual including, but not limited to, a thumb print, a retinal scan, or a breath-based alcohol measurement. Based upon the disclosure provided herein, one of ordinary skill in the art will recognize a variety of biometric data and corresponding sensors that may be used in relation to different embodiments. Under the direction of control circuitry 122, user identification circuitry 179 assembles one or more elements of data gathered by microphone 171, forward camera 172, reverse camera 173, a temperature sensor 175, and/or a biometric sensor 177 into a user identification package which is forwarded to central monitoring station 160 via wireless transceiver circuitry 128. User detached monitor device 120 additionally includes a motion detector 111 operable to discern whether user detached monitor device is moving. In some cases, motion detector 120 includes an accelerometer circuit. Based upon the disclosure provided herein, one of ordinary skill in the art will recognize various circuits and/or sensors capable of indicating that user detached monitor device is moving that may be used in relation to different embodiments.

User detached monitor device 120 additionally includes location circuitry 126. Location circuitry 126 may include one or more of, a GPS processing circuit capable of fixing a location of user detached monitor device 120 using GPS data, a WiFi based location circuit capable of fixing a location of user detached monitor device 120 using contact information with one or more WiFi access points, and/or a cell tower triangulation processing circuit capable of fixing a location of user detached monitor device 120 using cell tower triangulation data. A local communication link 181 controls communication between user detached monitor device 120 and user attached monitor device 110. In some embodiments, local communication link 181 supports a Bluetooth™ communication protocol and is capable of both receiving information from user attached monitor device 110 and transmitting information to user attached monitor device 110. In other embodiments, local communication link 181 supports a Wi-Fi communication protocol and is capable of both receiving information from user attached monitor device 110 and transmitting information to user attached monitor device 110. In some cases, local communication link 181 supports communication in only a receive or transmit direction. Based upon the disclosure provided herein, one of ordinary skill in the art will recognize a variety of communication protocols and information transfer directions that may be supported by local communication link 181 in accordance with different embodiments.

User detached monitor device 120 further includes a frame rate control module 172 that is capable of controlling image capture times of forward camera 172. In some embodiments, user detached monitor device 120 includes a prerecorded video detection module 1010. In some embodiments, prerecorded video detection module 1010 is implemented as instructions maintained on a memory (not shown) of user detached monitor device 120 that are executable by a processor (e.g., controller circuit 122) of user detached monitor device 120. In other embodiments, prerecorded video detection module 1010 is implemented as a dedicated circuit in user detached monitor device 120.

In some embodiments, prerecorded video detection module 1010 receives a series of images captured by forward camera 172. The series of images are captured at a rate controlled by a frame rate control module 193. The rate at which frame rate control module 193 causes the images to be captured is purposely varied from a standard video output rate. This may include, for example, capturing an image a varied rate (e.g., at an average of 30 Hz, but varying the period between captures as shown below in FIG. 3) and/or periodically moving the phase at which the capture occurs (shown below in FIG. 3).

Prerecorded video detection module 1010 generates a video output using a video rate of, for example, sixty (60) images per second to yield a sixty (60) frame per second. Based upon the disclosure provided herein, one of ordinary skill in the art will recognize a variety of rates at which the received series of images may be displayed to yield a video output.

Prerecorded video detection module 1010 then processes the video output to detect any artefacts caused by a mismatch in the sampling rate used by the user detached monitor device and a prerecorded video of the monitored individual. Where forward camera 172 of user detached monitor device 120 is trained on the face of the monitored individual, each image captured by user detached monitor device 120 will show all of the monitored individuals face similar to that shown below in FIG. 4A. In contrast, where forward camera 172 of user detached monitor device 120 is trained on a prerecorded video of the monitored individual, any mismatch between the sampling rate used by user detached monitor device 120 as directed by frame rate control module 193 and a frame rate and/or phase of the prerecorded video of the monitored individual will result in artefacts (e.g., partial images) as shown below in FIG. 4B.

Where a defined number of artefacts (e.g., artefacts per second) is detected, prerecorded video detection module 1010 provides an indication of a non-live video stream from user detached monitored device 120 to a processor (e.g., controller circuit 122) of user detached monitor device 120. This indication may then be transmitted to central monitoring station 160. The defined number of artefacts may, for example, be a user programmed variable. Such an indication may be used, for example, to alert a monitoring individual of an apparent attempt to cheat on the requested check-in. Alternative, where a defined number of artefacts (e.g., artefacts per second) is not detected, prerecorded video detection module 1010 provides an indication of a live video stream from user detached monitored device 120 to the processor (e.g., controller circuit 122) of user detached monitor device 120.

In some embodiments, user detached monitor device 120 includes a previously captured image detection module 1020. In some embodiments, previously captured image detection module 1020 is implemented as instructions maintained on a memory (not shown) of user detached monitor device 120 that are executable by a processor (e.g., controller circuit 122) of user detached monitor device 120. In other embodiments, previously captured image detection module 1020 is implemented as a dedicated circuit in user detached monitor device 120.

In some embodiments, previously captured image detection module 1020 receives the series of images captured by forward camera 172 of user detached monitor device 120. Previously captured image detection module 1020 determines whether a pre-captured static image of the monitored individual is being captured by forward camera 172 of user detached monitor device 120. In some cases, a monitored individual may direct the camera of the user detached monitor device to a previously captured image of the monitored individual. In such a case, the series of images received will be substantially the same. Where such substantial similarity is not detected by previously captured image detection module 1020, previously captured image detection module 1020 generates an indication of a non-live image that is provided to a processor (e.g., controller circuit 122) of user detached monitor device 120.

In some embodiments, detection of substantial similarity includes comparison of eyelid movement between captured images. Where it is found that the eyelid has transitioned from an upper value percent open to a lower value percent open or from the lower value percent open to the upper value percent open across a limited sequence of images of the monitored individual received from the user detached monitor device, the received images are considered to be of a live individual and not a previously captured image of the individual. In some embodiments, the upper value, the lower value, and/or the number of images (i.e., the limited sequence of images) are user programmable. The upper value and the lower value are measured as a percentage of the eyeball exposed by an open eyelid. Careful research and analysis has revealed that an upper value of eighty (80) percent open and the lower value of twenty (20) percent open provide a good balance between improperly characterizing a sequence of images from a live individual as from a previously captured image, and improperly characterizing a sequence of images from a previously captured image as being from a live individual.

Where such substantial similarity is detected by previously captured image detection module 1020, previously captured image detection module 1020 generates an indication of a live shot from user detached monitor device 120 that is sent to a processor (e.g., controller circuit 122) of user detached monitor device 120. User detached monitor device 120 may combine the indications of live images and live video and provide an indication of whether the images captured by forward camera 172 are of a live individual are from one of a previously captured image of an individual or a prerecorded video of an individual. This information may be transmitted from user detached monitor device 120 to central monitoring station 160.

Additionally, user detached monitor device 120 includes a user response application 199 that controls operation of one or more user impairment detection tests administered using user detached monitor device 120 and/or user attached monitor device 110, and/or one or more diagnostic tests. In some embodiments, such impairment tests may be implemented similar to that discussed in U.S. Pat. Pub. No. US2020/0367801 entitled "Systems and Methods for Balance Deviation Detection in a Monitoring System" and filed Mar. 17, 2020 by Hanson et al. The entirety of the aforementioned reference is incorporated herein by reference for all purposes. In some embodiments, such diagnostic tests may be implemented similar to that discussed in U.S. Pat. No. 10,893,383 entitled "Systems and Methods for Monitoring System Equipment Diagnosis" and filed May 6, 2019 by Buck et al. The entirety of the aforementioned reference is incorporated herein by reference for all purposes.

Figure 2A:
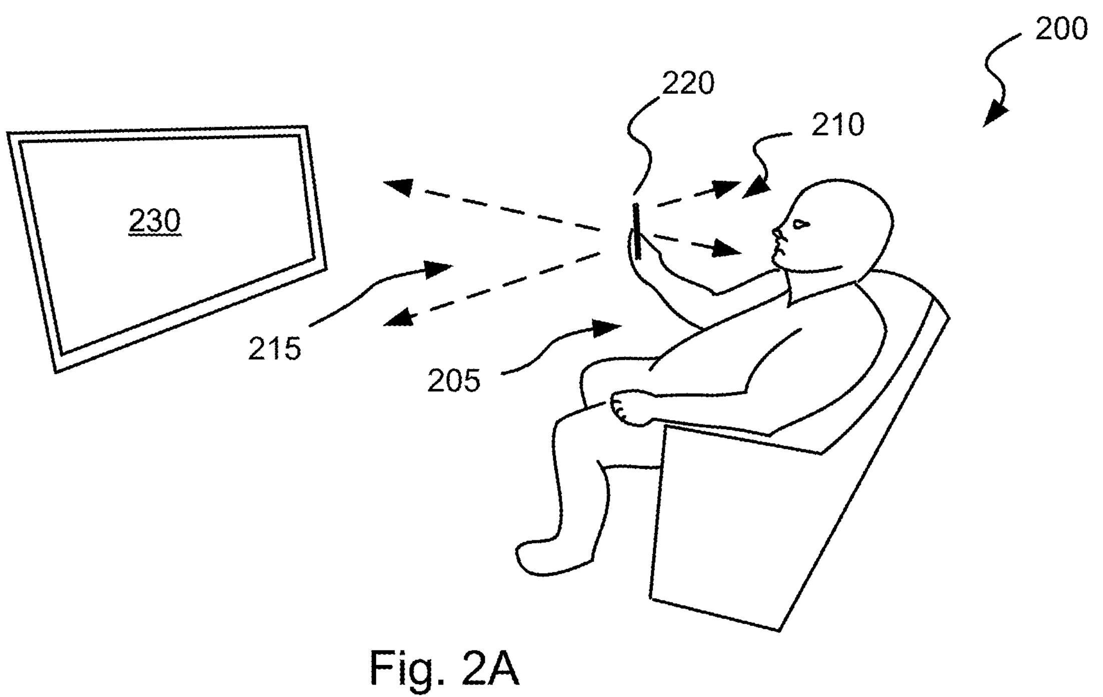
FIG. 2A visually depicts a monitored individual engaged in a video conference call using a user detached monitored device in accordance with various embodiments.

Turning to FIG. 2A, a monitored individual 205 is shown holding a user detached monitor device 120 having two cameras (e.g., forward camera 172 and reverse camera 173), with one of the cameras pointed forward toward the face monitored individual 205 (generating a forward video image stream corresponding to a forward field of view 210) and the other of the two cameras pointed in reverse away from the face of monitored individual 205 (generating a reverse video image stream corresponding to a reverse field of view 215). The forward field of view shows primarily monitored individual 205, and reverse field of view 215 shows various surroundings (e.g., a television 230) of monitored individual 205. A static image or a video image of monitored individual may be displayed, for example on television 230. Depending on the direction that monitored individual 205 holds user detached monitor device 120, as examples, either an image of the live face of monitored individual 205 will be captured by forward camera 172 or the image displayed on television 230 will be captured by forward camera 172.

Figure 2B:
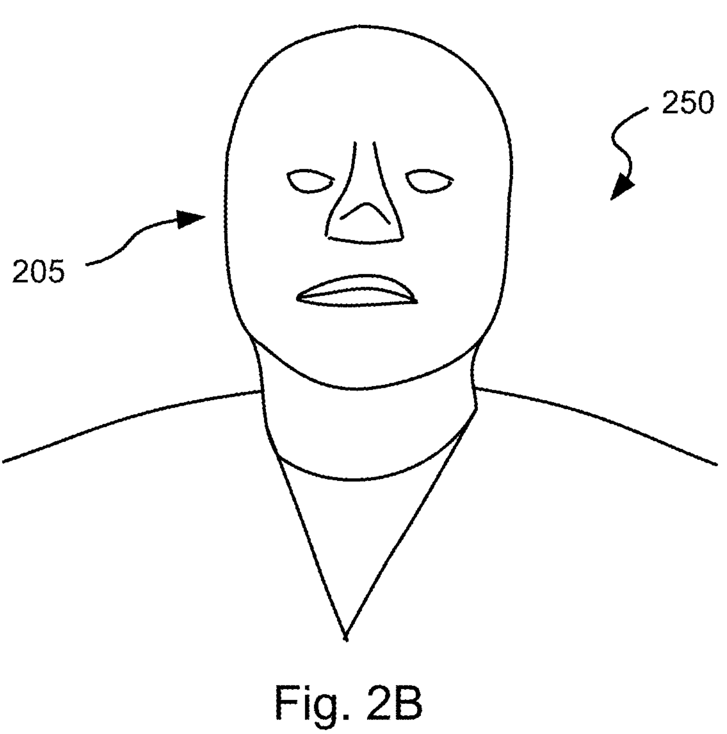
FIG. 2B visually depicts a live image of a monitored individual captured by a user detached monitor device in accordance with one or more embodiments.
Figure 2C:
FIG. 2C visually depicts a pre-captured static image or a prerecorded video of a monitored individual captured by a user detached monitor device in accordance with various.
Figure 2C:
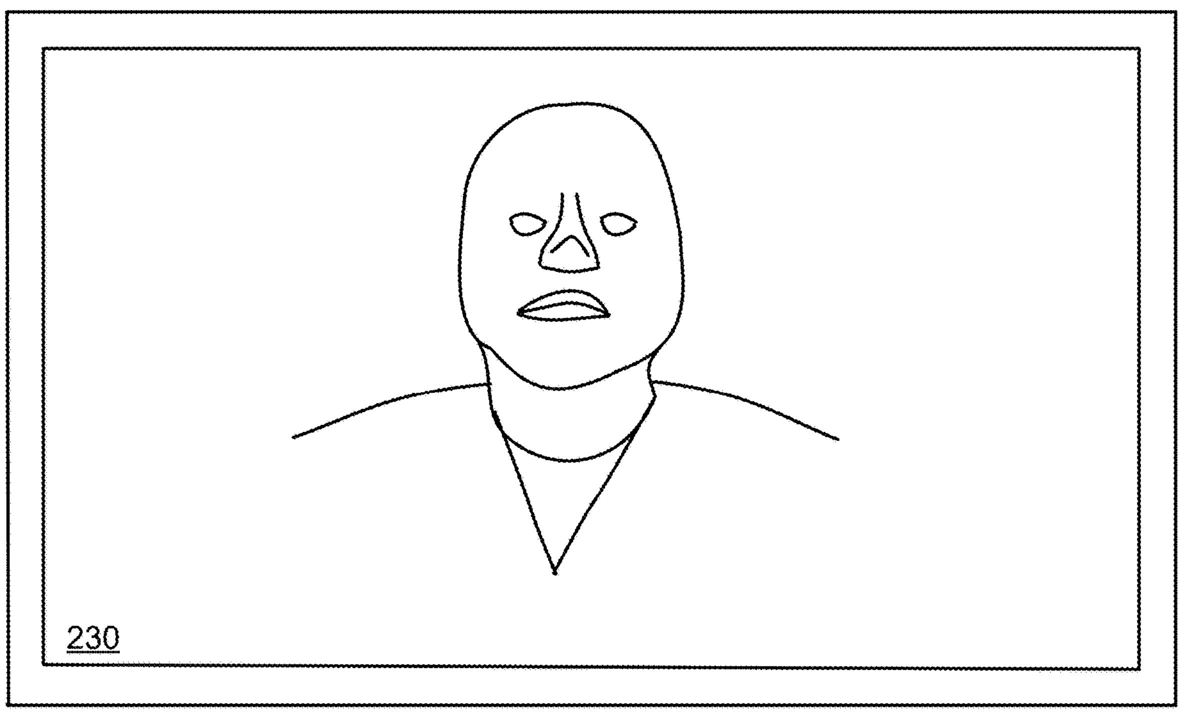

Turning to FIG. 2B, an example forward video stream 250 corresponding to forward field of view 210 of monitored individual 205 of FIG. 2A is shown. This is an example of the single video stream transmitted when forward camera 172 is trained on the monitored individual's live face. As suggested above, forward camera 172 may alternatively be trained on another previously captured image or video image of monitored individual 205 displayed, for example, on television 230 as shown in FIG. 2C. forward camera 172 may be directed such that only the image and not the outline of television 230 is shown. Such may produce a similar image of monitored individual as that produced when forward camera 172 is trained on the live face of monitored individual 205, and different embodiments discussed herein may be used to discern between the live face of FIG. 2B and the previously captured or prerecorded face of FIG. 2C.

Figure 3:
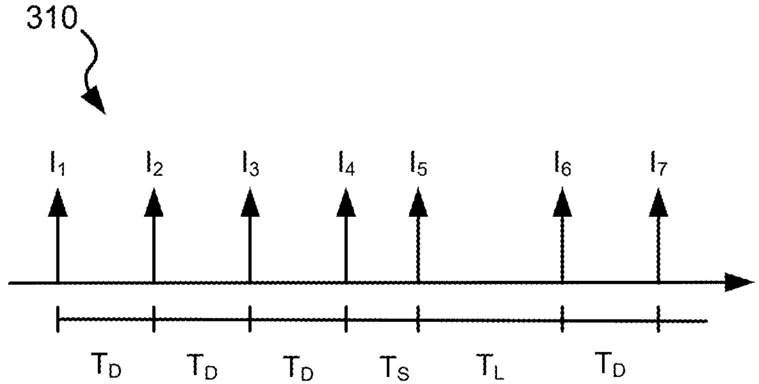
FIG. 3 shows a standard video rate diagram and a variable image capture timing diagram showing variance in both the rate of image capture and phase of image capture that may be implemented by a frame rate control module of a user detached monitor device in accordance with some embodiments.
Figure 3:
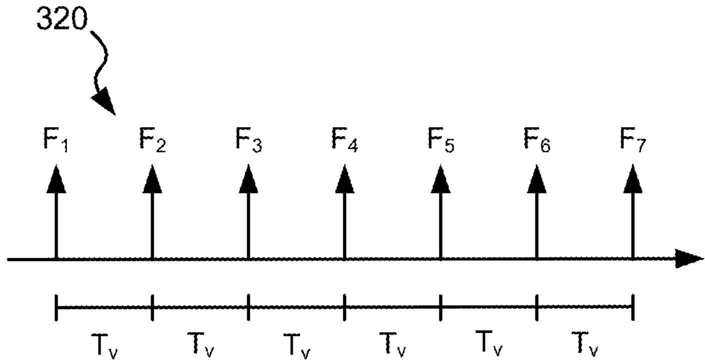

Turning to FIG. 3, a standard video rate diagram 320 is show where each frame of the video is displayed (in the case of a video output) or video is captured (in the case of a video input) at a defined frame rate (a consistent period Tv). The resulting video has a number of frames (F1, F2, F3, F4, F5, F6, F7) that occur at a substantially constant interval (e.g., 60 Hz). In some cases Tv may vary slightly due to jitter or other factors, but in general the periods remain constant.

Figures 4A, 4B:
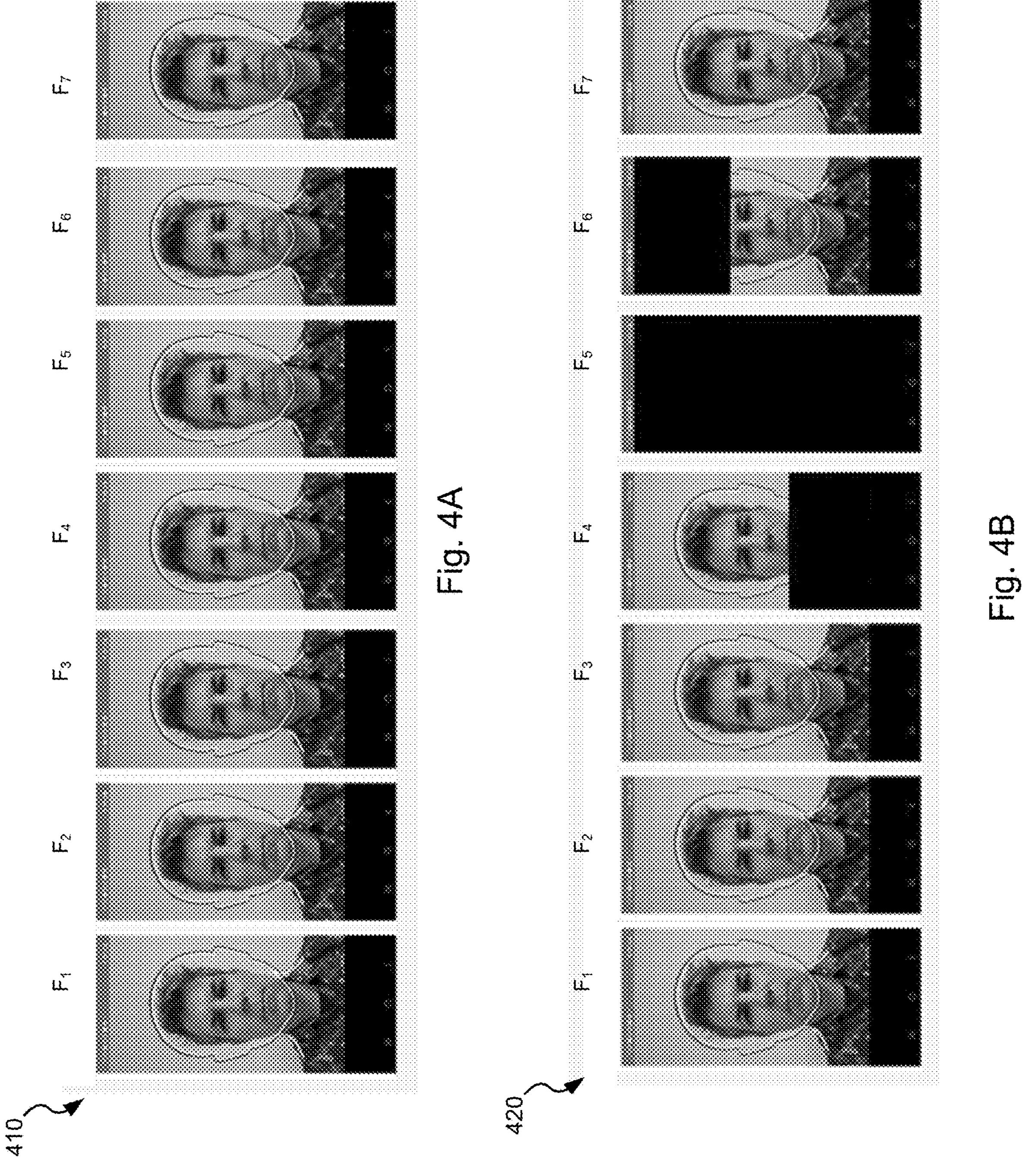
FIG. 4A shows a series of frames of a video output derived from images captured of a monitored individual using a user detached monitor device where the user detached monitor device is imaging the live monitored individual.
FIG. 4B shows a series of frames of a video output derived from images captured of a monitored individual using a user detached monitor device where the user detached monitor device is imaging a prerecorded video of the monitored individual.

A variable image capture timing diagram 310 shows an image timing output that is generated by frame rate control 193. In this embodiment, the timing varies in both the rate of image capture (e.g., the period Ts is shorter than the period $T_D$, and the period $T_L$ is longer than the period $T_D$) and phase of image capture (each of samples I1, I2, I3, I4, I5, I6, I7) are not phase aligned with a non-varying clock. In some embodiments, frame rate control 193 generates the image timing output by modifying a default periodic timing (e.g., a periodic timing with a default period of $T_D$). In some embodiments, the periodicity of the image timing output may be on average the same as a video input or output, but frame rate control module 193 purposefully varies (e.g., by adding a short period Ts or a long period $T_L$). Such purposeful modification of the image sample rate of forward camera 172 results in artefacts similar to those shown in FIG. 4B below where forward camera 172 is trained on a prerecorded video of a monitored individual as the prerecorded video will have a timing mismatch from that generated by frame rate control module 172. Alternatively, where forward camera 172 is trained on the live face of the monitored individual no artefacts (as shown in FIG. 4A below) will occur. Frame rate control 193 may operate by modifying one or both of the phase or period of the default periodic timing.

Turning to FIG. 4A, a series of series captured by forward camera 172 directed at the face of the monitored individual is shown as a series 410. Turning to FIG. 4B, a series of series captured by forward camera 172 directed at a display showing a prerecorded video of the monitored individual is shown as a series 420. The artefacts in frames F1-F6 of series 420 are due to a mismatch in the rate of the display of the prerecorded video and the rate directed by frame rate control module 193.

Figure 5:
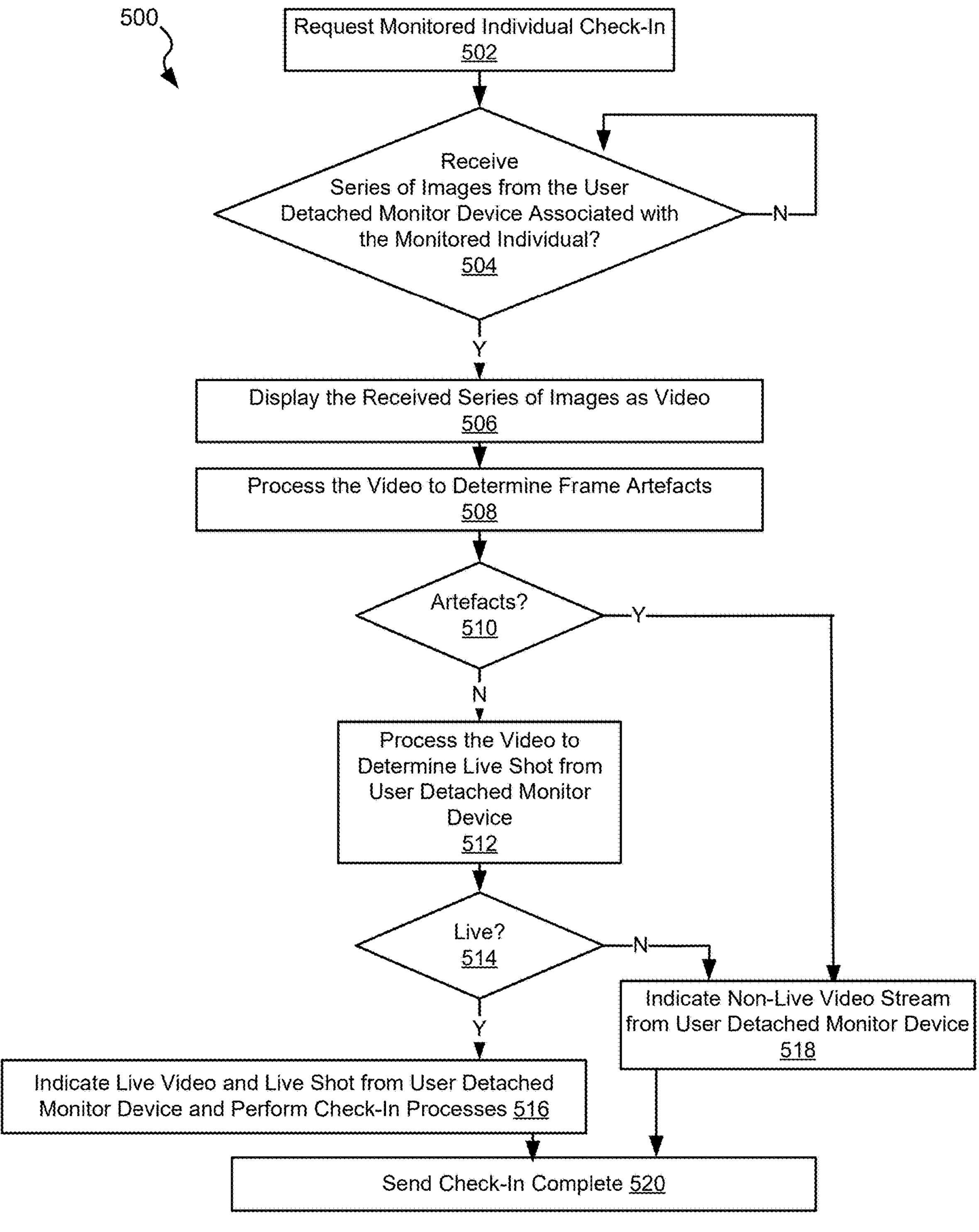
FIG. 5 is a flow diagram showing a method for identifying images of a monitored individual captured from a prerecorded video and/or from a previously captured image in accordance with some embodiments.

Turning to FIG. 5, a flow diagram 500 shows a method for identifying images of a monitored individual captured from a prerecorded video in accordance with some embodiments. The processes of flow diagram 500 are shown from the perspective of the processes being implemented on a central monitoring station receiving a series of images from a user detached monitor device. In other embodiments, one or more of the processes may be implemented on the user detached monitor device with an indication of whether the series of images are live images or where derived from a prerecorded video of the monitored individual.

Following flow diagram 500, a monitored individual is requested to check-in (block 502). This may include, for example, generating a check-in message on a central monitoring station and sending the check-in message to a user detached monitor device associated with the monitored individual via a wide area network. The check-in message may be generated, for example, based upon a periodic timer, based upon a request from a monitoring individual, and/or based upon a predefined check-in schedule. Based upon the disclosure provided herein, one of ordinary skill in the art will recognize a variety of check-in messages and/or approaches for generating such messages that may be used in relation to different embodiments.

Upon receiving the check-in request, the monitored individual is expected to engage in taking a video (i.e., a series of images) of their face (in some cases as part of a video conference with a monitoring individual) using the user detached monitor device to capture images of the monitored individual. It is determined whether the user detached monitor device associated with the monitored individual has begun transferring images of the monitored individual (block 504). In some cases, the process waits until the series of images stabilizes showing, for example, a face shot of the monitored individual. The series of images received from the user detached monitor device are captured based upon a frame rate control module of the user attached monitor device. As discussed above, this frame rate control module causes changes in one or both of the period of the image capture and/or the phase of the image capture.

The received series of images are displayed as a video on a display of the central monitoring station and/or a user interaction system deployed in relation to the central monitoring station (block 506). The rate of the display may be, for example, sixty (60) images per second to yield a sixty (60) frame per second video output. Based upon the disclosure provided herein, one of ordinary skill in the art will recognize a variety of rates at which the received series of images may be displayed to yield a video output.

The video is processed to detect any artefacts caused by a mismatch in the sampling rate used by the user detached monitor device and a prerecorded video of the monitored individual (block 508). Where the camera of the user detached monitor device is trained on the face of the monitored individual, each image captured by the user detached monitor device will show all of the monitored individuals face similar to that shown above in FIG. 4A. In contrast, where the camera of the user detached monitor device is trained on a prerecorded video of the monitored individual, any mismatch between the sampling rate used by the user detached monitor device and a frame rate and/or phase of the prerecorded video of the monitored individual will result in artefacts (e.g., partial images) as shown above in frames F4-F6 of FIG. 4B.

Where a defined number of artefacts (e.g., artefacts per second) is detected (block 510), an indication of a non-live video stream from the user detached monitored device is set (block 518). The defined number of artefacts may, for example, be a user programmed variable. Such an indication may be used, for example, to alert a monitoring individual of an apparent attempt to cheat on the requested check-in.

Alternatively, where the defined number of artefacts is not detected (e.g., artefacts per second) (block 510), it is determined whether a pre-captured static image of the monitored individual is being captured by the user detached monitor device (block 512). In some cases, a monitored individual may direct the camera of the user detached monitor device to a previously captured image of the monitored individual. In such a case, the series of images received will be substantially the same. Where such substantial similarity is detected (block 514), the indication of a non-live video stream from the user detached monitored device is set (block 518).

In some embodiments, detection of substantial similarity includes comparison of eyelid movement between captured images. Where it is found that the eyelid has transitioned from an upper value percent open to a lower value percent open or from the lower value percent open to the upper value percent open across a limited sequence of images of the monitored individual received from the user detached monitor device, the received images are considered to be of a live individual and not a previously captured image of the individual. In some embodiments, the upper value, the lower value, and/or the number of images (i.e., the limited sequence of images) are user programmable. The upper value and the lower value are measured as a percentage of the eyeball exposed by an open eyelid. Careful research and analysis has revealed that an upper value of eighty (80) percent open and the lower value of twenty (20) percent open provide a good balance between improperly characterizing a sequence of images from a live individual as from a previously captured image, and improperly characterizing a sequence of images from a previously captured image as being from a live individual.

Where such substantial similarity is not detected (block 514), an indication of a live video and a live shot from the user detached monitor device is set and the check-in processes are completed (block 516). Once either the check-in processes are completed (block 516) or an indication of a non-live video stream is indicated (block 518), a check-in complete message is sent to the user detached monitor device (block 520). Based on this message, the user detached monitor device ends its check-processing.

It is noted that in some embodiments, frame rate control 193 is not included, but rather whatever standard timing used to support a video conference is used to control capturing images of the monitored individual's face. In such embodiments, the images captured in accordance with the standard timing are used to both check for substantial similarity (blocks 512-514) and to check for artefacts (blocks 508-510). In most cases there will be a sufficient mismatch (phase and/or frequency) between the standard timing and whatever timing is used to display a prerecorded video of the monitored individual.

Figure 6:
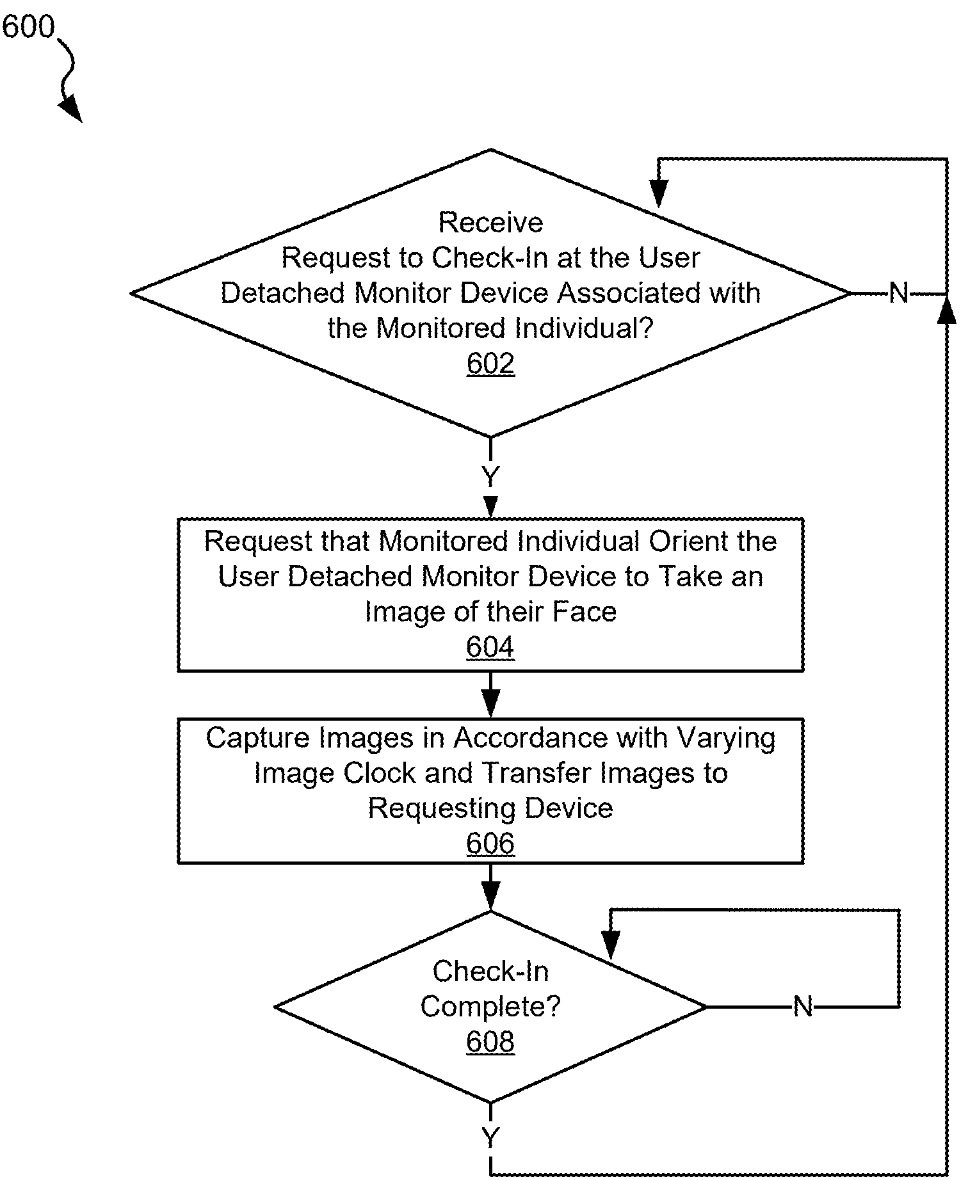
FIG. 6 is a flow diagram showing a check-in process of a monitored individual from the perspective of a user detached monitor where the images are captured in accordance with a varying image clock controlled by a frame rate control of a user detached monitor device in accordance with some embodiments.

Turning to FIG. 6, a flow diagram 600 shows a check-in process of a monitored individual from the perspective of a user detached monitor where the images are captured in accordance with a varying image clock controlled by a frame rate control of a user detached monitor device in accordance with some embodiments. Following flow diagram 600, the user detached monitor device determines whether it has received a request to check-in (block 602). Such a request to check-in may be received by any number of mechanisms. For example, a request to check-in may be triggered by a timer in the user detached monitor device indicating a time for a periodic check-in. As another example, a request to check-in may be based upon a schedule in the user detached monitor device indicating a predetermined check-in. As yet another example, a request to check-in may be received from a central monitoring station via a wide area network. Based upon the disclosure provided herein, one of ordinary skill in the art will recognize a variety of ways in which a request to check-in may be received and/or generated by a user detached monitor device.

Where a request to check-in has been received (block 602), the monitored individual is requested to orient the user detached monitor device to take an image of their face (block 604). This may include, for example, displaying a message on a display of the user detached monitor device and/or playing an audio output with the request. Based upon the disclosure provided herein, one of ordinary skill in the art will recognize a variety of ways in which a request for the monitored individual to take an image of their face may be done.

With the user detached monitor device oriented to take the requested image, images are captured in accordance with a varying image clock and the images are transmitted to a requesting device (e.g., a central monitoring station) (block 606). The aforementioned varying image clock may be generated, for example, by a frame rate control module or circuit of the user detached monitor device. The varying image clock is purposely varied to avoid synchronization with a video image of the monitored individual's face from which images may be captured to appear like the images are being captured from the live face of the monitored individual.

Images continue to be captured and transferred until a check-in complete message is received (block 608). The check-in complete message is received from the receiving device (e.g., the central monitoring station) once the check-in process is complete. This check-in complete message may be, but is not limited to, the check-in complete message discussed above in relation to block 520 of FIG. 5. Once the check-in complete message is received (block 608), image capture ends and the process returns to await another request for check-in (block 602).

Figure 7:
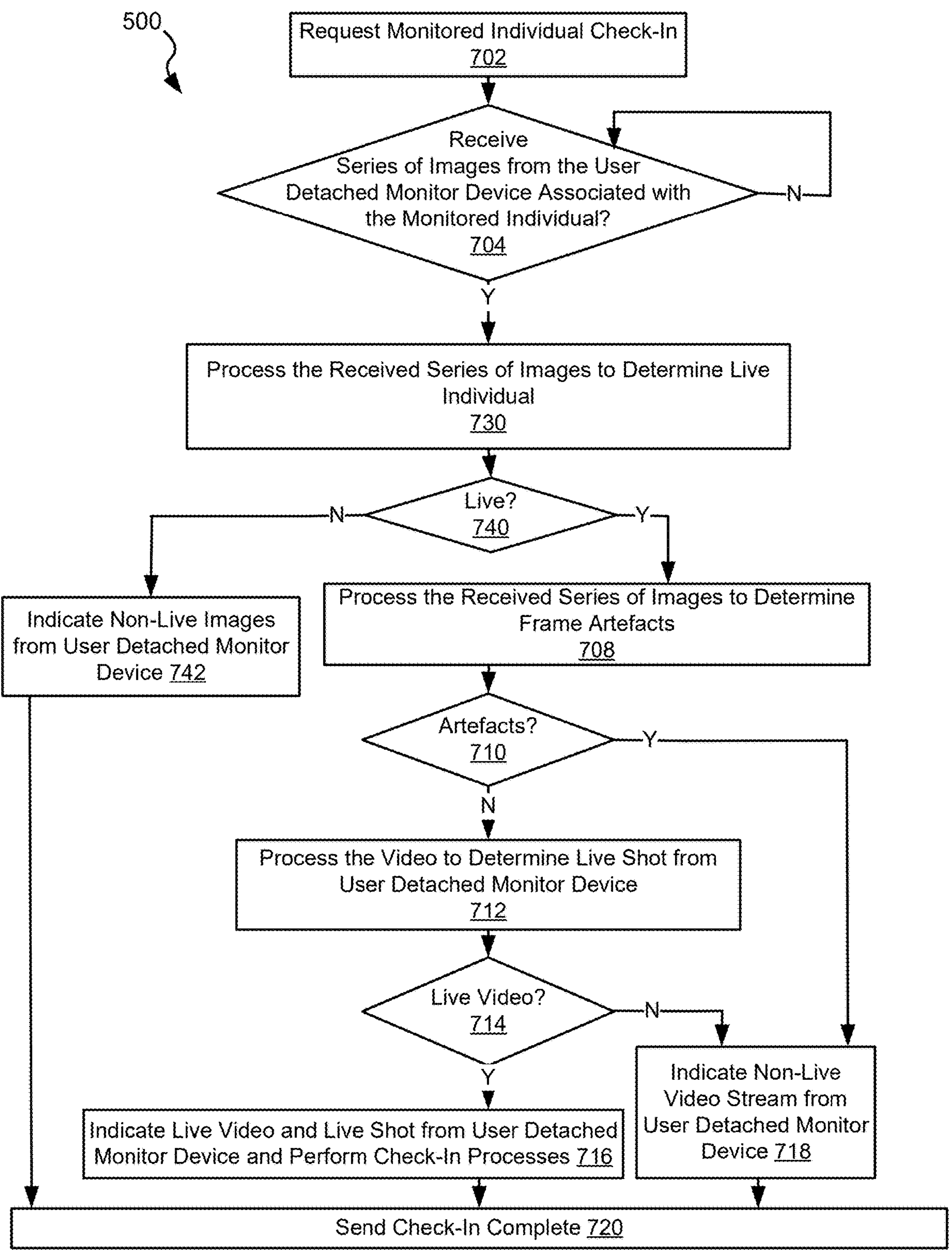
FIG. 7 is a flow diagram showing a method for identifying both images of a monitored individual captured from a static image of the monitored individual and/or captured from a prerecorded video in accordance with various embodiments.

Turning to FIG. 7, a flow diagram 700 shows a method for identifying images of a monitored individual captured from a prerecorded video and/or a static image in accordance with various embodiments. The processes of flow diagram 700 are shown from the perspective of the processes being implemented on a central monitoring station receiving a series of images from a user detached monitor device. In other embodiments, one or more of the processes may be implemented on the user detached monitor device with an indication of whether the series of images are live images or where derived from a prerecorded video of the monitored individual.

Following flow diagram 700, a monitored individual is requested to check-in (block 702). This may include, for example, generating a check-in message on a central monitoring station and sending the check-in message to a user detached monitor device associated with the monitored individual via a wide area network. The check-in message may be generated, for example, based upon a periodic timer, based upon a request from a monitoring individual, and/or based upon a predefined check-in schedule. Based upon the disclosure provided herein, one of ordinary skill in the art will recognize a variety of check-in messages and/or approaches for generating such messages that may be used in relation to different embodiments.

Upon receiving the check-in request, the monitored individual is expected to engage in taking a video (i.e., a series of images) of their face (in some cases as part of a video conference with a monitoring individual) using the user detached monitor device to capture images of the monitored individual. It is determined whether the user detached monitor device associated with the monitored individual has begun transferring images of the monitored individual (block 704). In some cases, the process waits until the series of images stabilizes showing, for example, a face shot of the monitored individual. The series of images received from the user detached monitor device are captured based upon a frame rate control module of the user attached monitor device. As discussed above, this frame rate control module causes changes in one or both of the period of the image capture and/or the phase of the image capture.

Where it is determined that a series of images is being received from the user detached monitor device (block 704), the received series of images are processed to determine whether the images are of a live individual or are from a pre-captured static image of the monitored individual (block 730). In some cases, a monitored individual may direct the camera of the user detached monitor device to a previously captured image of the monitored individual. In such a case, the series of images received will be substantially the same. Where such substantial similarity is not detected (i.e., the images are from a live individual) (block 740), the indication of a non-live video stream from the user detached monitored device is set (block 742).

In some embodiments, detection of substantial similarity includes comparison of eyelid movement between captured images. Where it is found that the eyelid has transitioned from an upper value percent open to a lower value percent open or from the lower value percent open to the upper value percent open across a limited sequence of images of the monitored individual received from the user detached monitor device, the received images are considered to be of a live individual and not a previously captured image of the individual. In some embodiments, the upper value, the lower value, and/or the number of images (i.e., the limited sequence of images) are user programmable. The upper value and the lower value are measured as a percentage of the eyeball exposed by an open eyelid. Careful research and analysis has revealed that an upper value of eighty (80) percent open and the lower value of twenty (20) percent open provide a good balance between improperly characterizing a sequence of images from a live individual as from a previously captured image, and improperly characterizing a sequence of images from a previously captured image as being from a live individual.

Where such substantial similarity is detected (block 740), a non-live image from the user detached monitor device is indicated (block 742). This non-live image causes a failure of the check-in process and a check-in process complete message is sent to the user detached monitor device (block 720). Based on this message, the user detached monitor device ends its check-processing.

Alternatively, where such substantial similarity is detected (block 740), live images from the user detached monitor device are indicated, and the received series of images are processed to determine any frame artefacts caused by a mismatch in the sampling rate used by the user detached monitor device and a prerecorded video of the monitored individual (block 708). Where the camera of the user detached monitor device is trained on the face of the monitored individual, each image captured by the user detached monitor device will show all of the monitored individuals face similar to that shown above in FIG. 4A. In contrast, where the camera of the user detached monitor device is trained on a prerecorded video of the monitored individual, any mismatch between the sampling rate used by the user detached monitor device and a frame rate and/or phase of the prerecorded video of the monitored individual will result in artefacts (e.g., partial images) as shown above in frames F4-F6 of FIG. 4B.

Where a defined number of artefacts (e.g., artefacts per second) is detected (block 710), an indication of a non-live video stream from the user detached monitored device is set (block 718). The defined number of artefacts may, for example, be a user programmed variable. Such an indication may be used, for example, to alert a monitoring individual of an apparent attempt to cheat on the requested check-in. This non-live image causes a failure of the check-in process and a check-in process complete message is sent to the user detached monitor device (block 720). Based on this message, the user detached monitor device ends its check-processing.

Alternatively, where the defined number of artefacts is not detected (e.g., artefacts per second) (block 710), both live video and live image of the monitored individual are indicated (block 716). At this juncture, having determined that the series of images received from the user detached monitor device are from a live individual, remaining check-in processes may be completed. Such remaining check-in processes may include, but are not limited to, having the individual recite their name, engage in an interview, and/or perform one or more physical actions. Based upon the disclosure provided herein, one of ordinary skill in the art will recognize a variety of processes that may be performed in relation to a check-in process in accordance with different embodiments. Once the check-in process is complete, the check-in process complete message is sent to the user detached monitor device (block 720). Based on this message, the user detached monitor device ends its check-processing.

It is noted that in some embodiments, frame rate control 193 is not included, but rather whatever standard timing used to support a video conference is used to control capturing images of the monitored individual's face. In such embodiments, the images captured in accordance with the standard timing are used to both check for substantial similarity (blocks 708-710) and to check for artefacts (blocks 712-714). In most cases there will be a sufficient mismatch (phase and/or frequency) between the standard timing and whatever timing is used to display a prerecorded video of the monitored individual.

Figure 8:
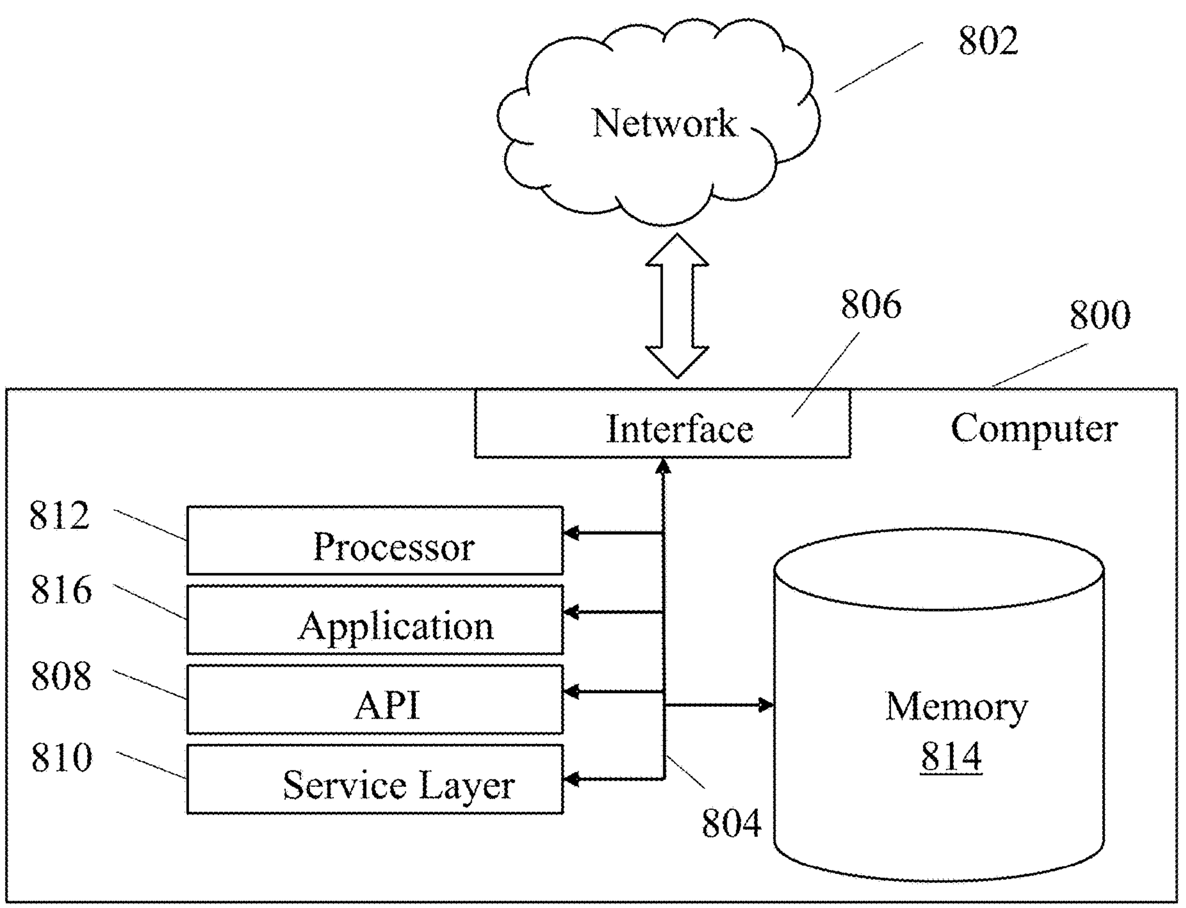
FIG. 8 shows an example computer system that may include similar components to those used by various elements of embodiments discussed herein.

Turning to FIG. 8, an example computer system 800 is shown that includes similar components to those that may be used by various elements of some embodiments discussed herein. In some embodiments, one or more elements of user detached monitor device 120, user attached monitor device 110, central monitoring station 160, and/or user interaction system 185 may be implemented similar to computer system 800 and/or may include similar components to computer system 800. Computer system 800 is one example of a large number of computer systems that may be used to implement different embodiments. Based upon the disclosure provided herein, one of ordinary skill in the art will recognize a wide variety of computer systems that may be used in relation to different embodiments.

Computer system 800 is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, computer system 800 may include a computer that includes an input device, such as a keypad, keyboard, touch screen, or other device that can accept user information, and an output device that conveys information associated with the operation of computer system 800, including digital data, visual, or audio information (or a combination of information), or a GUI.

Computer system 800 can serve in a role as a client, network component, a server, a database or other persistency, or any other component (or a combination of roles) of a computer system for performing the subject matter described in the instant disclosure. Computer system 800 is communicably coupled with a network 802. In some implementations, one or more components of computer system 800 may be configured to operate within environments, including cloud-computing-based, local, global, or other environment (or a combination of environments).

At a high level, computer system 800 is an electronic computing device operable to receive, transmit, process, store, or manage data and information associated with the described subject matter. According to some implementations, computer system 800 may also include or be communicably coupled with an application server, e-mail server, web server, caching server, streaming data server, business intelligence (BI) server, or other server (or a combination of servers).

Computer system 800 can receive requests over network 802 from a client application (for example, executing on another computer system (not shown) and responding to the received requests by processing the said requests in an appropriate software application. In addition, requests may also be sent to computer system 800 from internal users (for example, from a command console or by other appropriate access method), external or third-parties, other automated applications, as well as any other appropriate entities, individuals, systems, or computers.

Each of the components of computer system 800 can communicate using a system bus 804. In some implementations, any or all of the components of the computer system 800, both hardware or software (or a combination of hardware and software), may interface with each other or interface 806 (or a combination of both) over system bus 804 using an application programming interface (API) 808 or a service layer 810 (or a combination of API 808 and service layer 810. API 808 may include specifications for routines, data structures, and object classes. API 808 may be either computer-language independent or dependent and refer to a complete interface, a single function, or even a set of APIs. Service layer 810 provides software services to computer system 800 or other components (whether or not illustrated) that are communicably coupled to computer system 800. The functionality of computer system 800 may be accessible for all service consumers using this service layer. Software services, such as those provided by service layer 810, provide reusable, defined business functionalities through a defined interface. For example, the interface may be software written in JAVA, C++, or other suitable language providing data in extensible markup language (XML) format or other suitable format. While illustrated as an integrated component of computer system 800, alternative implementations may illustrate API 808 or service layer 810 as stand-alone components in relation to other components of computer system 800 or other components (whether or not illustrated) that are communicably coupled to computer system 800. Moreover, any or all parts of API 808 or service layer 810 may be implemented as child or sub-modules of another software module, enterprise application, or hardware module without departing from the scope of this disclosure.

Computer system 800 includes an interface 806. Although illustrated as a single interface 806 in FIG. 8, two or more interfaces 806 may be used according to particular needs, desires, or particular implementations of computer system 800. Interface 806 is used by computer system 800 for communicating with other systems in a distributed environment that are connected to the network 802. Generally, the interface 806 includes logic encoded in software or hardware (or a combination of software and hardware) and operable to communicate with the network 802. More specifically, the interface 806 may include software supporting one or more communication protocols associated with communications such that the network 802 or interface's hardware is operable to communicate physical signals within and outside of the illustrated computer system 800.

Computer system 800 includes at least one computer processor 812. Although illustrated as a single computer processor 812 in FIG. 8, two or more processors may be used according to particular needs, desires, or particular implementations of computer system 800. Generally, the computer processor 812 executes instructions and manipulates data to perform the operations of computer system 800 and any algorithms, methods, functions, processes, flows, and procedures as described in the instant disclosure.

Computer system 800 also includes a memory 814 that holds data for computer system 800 or other components (or a combination of both) that may be connected to the network 802. For example, memory 814 may be a database storing data consistent with this disclosure. Although illustrated as a single memory 814 in FIG. 8, two or more memories may be used according to particular needs, desires, or particular implementations of computer system 800 and the described functionality. While memory 814 is illustrated as an integral component of computer system 800, in alternative implementations, memory 814 may be external to computer system 800.

In addition to holding data, the memory may be a non-transitory medium storing computer readable instruction capable of execution by computer processor 812 and having the functionality for carrying out manipulation of the data including mathematical computations.

Application 816 is an algorithmic software engine providing functionality according to particular needs, desires, or particular implementations of computer system 800, particularly with respect to functionality described in this disclosure. For example, application 816 can serve as one or more components, modules, applications, etc. Further, although illustrated as a single application 816, application 816 may be implemented as multiple applications 816 on computer system 800. In addition, although illustrated as integral to computer system 800, in alternative implementations, application 816 may be external to computer system 800, There may be any number of computers 800 associated with, or external to, a computer system containing computer system 800, each computer system 800 communicating over network 802. Further, the term "client," "user," and other appropriate terminology may be used interchangeably as appropriate without departing from the scope of this disclosure. Moreover, this disclosure contemplates that many users may use one computer system 800, or that one user may use multiple computers 800.

In some embodiments, computer system 800 is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

In conclusion, the present invention provides for novel systems, devices, and methods for monitoring individuals. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for monitoring an individual, the system comprising:

a user detached monitor device, wherein the user detached monitor device includes:

a camera;

a frame rate control module configured to generate an image timing output that is modified in at least one phase;

a communication circuit; and a processor and a computer readable medium communicably coupled to the processor, wherein the computer readable medium includes instructions which when executed by the processor cause:

the camera to capture a series of images at respective times governed by the image timing output;

processing the series of images to detect artefacts indicative of images captured from a prerecorded video; and indicating that the series of images represent a live individual when fewer than a defined number of artefacts are detected.

2. The system of claim 1, wherein the frame rate control module generates the image timing output by adding a delay to at least one period of a default periodic timing to adjust at least a current phase of the default periodic timing.

3. The system of claim 1, wherein the frame rate control module generates the image timing output by modifying at least one period of a default periodic timing.

4. The system of claim 3, wherein modifying the modifying at least one period of the default periodic timing includes increasing a period of the default periodic timing.

5. The system of claim 3, wherein modifying the modifying at least one period of the default periodic timing includes decreasing a period of the default periodic timing.

6. The system of claim 5, wherein the at least one period of the default periodic timing is a first period, and wherein modifying the at least one period of a default periodic timing further comprises increasing a subsequent period of the default periodic timing.

7. The system of claim 6, wherein the increasing the subsequent period is a magnitude, and wherein the decreasing the subsequent period is the same magnitude resulting in an average period of the image timing output being the same as an average period of the default periodic timing.

8. The system of claim 1, wherein the computer readable medium further includes instructions which when executed by the processor cause:

processing the series of images to detect eyelid movement between respective ones of the series of images; and indicating that the series of images represent a live individual when a defined number of eyelid movements are detected.

9. The system of claim 8, wherein an eyelid movement is defined as a movement between greater than or equal to eighty percent open and less than or equal to twenty percent open.

10. The system of claim 1, wherein the artefacts are detected each time one of the series of images is incomplete.

11. A system for monitoring an individual, the system comprising:

a user detached monitor device, wherein the user detached monitor device includes:

a camera;

a frame rate control module configured to generate an image timing output that is modified in at least one of phase;

a communication circuit; and a first processor and a first computer readable medium communicably coupled to the first processor, wherein the first computer readable medium includes instructions which when executed by the first processor cause:

the camera to capture a series of images at respective times governed by the image timing output; and the communication circuit to transmit the series of images to a central monitoring station;

the central monitoring station communicably coupled to the user detached monitor device via the communication circuit, wherein the central monitoring station comprises:

a second processor and a second computer readable medium communicably coupled to the second processor, wherein the second computer readable medium includes instructions which when executed by the second processor cause:

the central monitoring station to process the series of images to detect artefacts indicative of images captured from a prerecorded video; and indicate that the series of images represent a live individual when fewer than a defined number of artefacts are detected.

12. The system of claim 11, wherein the artefacts are detected each time one of the series of images is incomplete.

13. The system of claim 11, wherein the frame rate control module generates the image timing output by adding a delay to at least one period of a default periodic timing to adjust at least a current phase of the default periodic timing.

14. The system of claim 11, wherein the frame rate control module generates the image timing output by modifying at least one period of a default periodic timing.

15. The system of claim 11, wherein the second computer readable medium further includes instructions which when executed by the second processor cause:

the central monitoring station to process the series of images to detect eyelid movement between respective ones of the series of images; and indicate that the series of images represent a live individual when a defined number of eyelid movements are detected.

16. The system of claim 15, wherein an eyelid movement is defined as a movement between greater than or equal to eighty percent open and less than or equal to twenty percent open.

17. A system for monitoring an individual, the system comprising:

a user detached monitor device, wherein the user detached monitor device includes:

a camera;

a frame rate control module configured to generate an image timing output that is modified in at least one of phase;

a communication circuit; and a first processor and a first computer readable medium communicably coupled to the first processor, wherein the first computer readable medium includes instructions which when executed by the first processor cause:

the camera to capture a series of images at respective times governed by the image timing output; and the communication circuit to transmit the series of images to a central monitoring station;

the central monitoring station communicably coupled to the user detached monitor device via the communication circuit, wherein the central monitoring station comprises:

a second processor and a second computer readable medium communicably coupled to the second processor, wherein the second computer readable medium includes instructions which when executed by the second processor cause:

the central monitoring station to process the series of images to detect artefacts indicative of images captured from a prerecorded video; and indicate that the series of images represent a live individual when fewer than a defined number of artefacts are detected.

18. The system of claim 17, wherein the artefacts are detected each time one of the series of images is incomplete.

19. The system of claim 17, wherein the frame rate control module generates the image timing output by modifying at least one period of a default periodic timing.

* * * * *